United States Patent [19]

Motoyoshi et al.

[11] Patent Number: 5,022,019

[45] Date of Patent: Jun. 4, 1991

[54] DISK-STORAGE DEVICE

[75] Inventors: Takeo Motoyoshi; Katsufusa Tanaka, both of Amagasaki, Japan

[73] Assignee: Mitsubishi Denki Kabushiki Kaisha, Japan

[21] Appl. No.: 440,820

[22] Filed: Nov. 22, 1989

[30] Foreign Application Priority Data

Nov. 24, 1988 [JP] Japan ................................ 63-296524

[51] Int. Cl.⁵ ........................ G11B 17/22; G11B 15/68
[52] U.S. Cl. ........................................ 369/36; 369/38; 360/92
[58] Field of Search ........................ 369/34, 35, 36, 37, 369/38; 360/8, 22, 23, 92; 370/4

[56] References Cited

U.S. PATENT DOCUMENTS

| | | | |
|---|---|---|---|
| 4,270,150 | 5/1981 | Diermann et al. | 360/22 |
| 4,561,078 | 12/1985 | Nakayama | 369/38 |
| 4,608,679 | 8/1986 | Rudy et al. | 369/36 |
| 4,675,856 | 6/1987 | Rudy et al. | 369/36 |
| 4,787,074 | 11/1988 | Deck et al. | 369/36 |
| 4,817,071 | 3/1989 | Carlson et al. | 369/36 |

Primary Examiner—Stuart S. Levy
Assistant Examiner—Kenneth B. Wells
Attorney, Agent, or Firm—Leydig, Voit & Mayer

[57] ABSTRACT

A disk-storage device comprising a conveying mechanism having a plurality of clutching sections for clutching cartridges; a plurality of recording/reproducing units for recording and reproducing information on and from disks in the cartridges; and a plurality of lodging shelves for lodging cartridges. The number of recording/reproducing units and of lodging shelves is the same as the number of clutching sections, these three categories of components being arranged in the same positional relationship. They are all contained in a case having cartridge-supply/discharge openings through which cartridges are put into and taken out of the device. To enable a plurality of cartridges to be simultaneously held by the clutching sections of the conveying mechanism, a plurality of loading mechanisms temporarily hold cartridges, adjusting their positions accordingly. The cartridge-supply/discharge openings and the loading mechanisms are arranged in the same positional relationship. The device further comprises a divisional recording means adapted to time-divide information from the exterior and to distribute the information thus divided to the recording/reproducing units so as to record it on the disks in the cartridges, and a synthetic reproduction means adapted to synthesize information recorded on the disks by the recording/reproducing units in predetermined equal periods and to transmit it to the exterior.

5 Claims, 16 Drawing Sheets

F I G. 13A
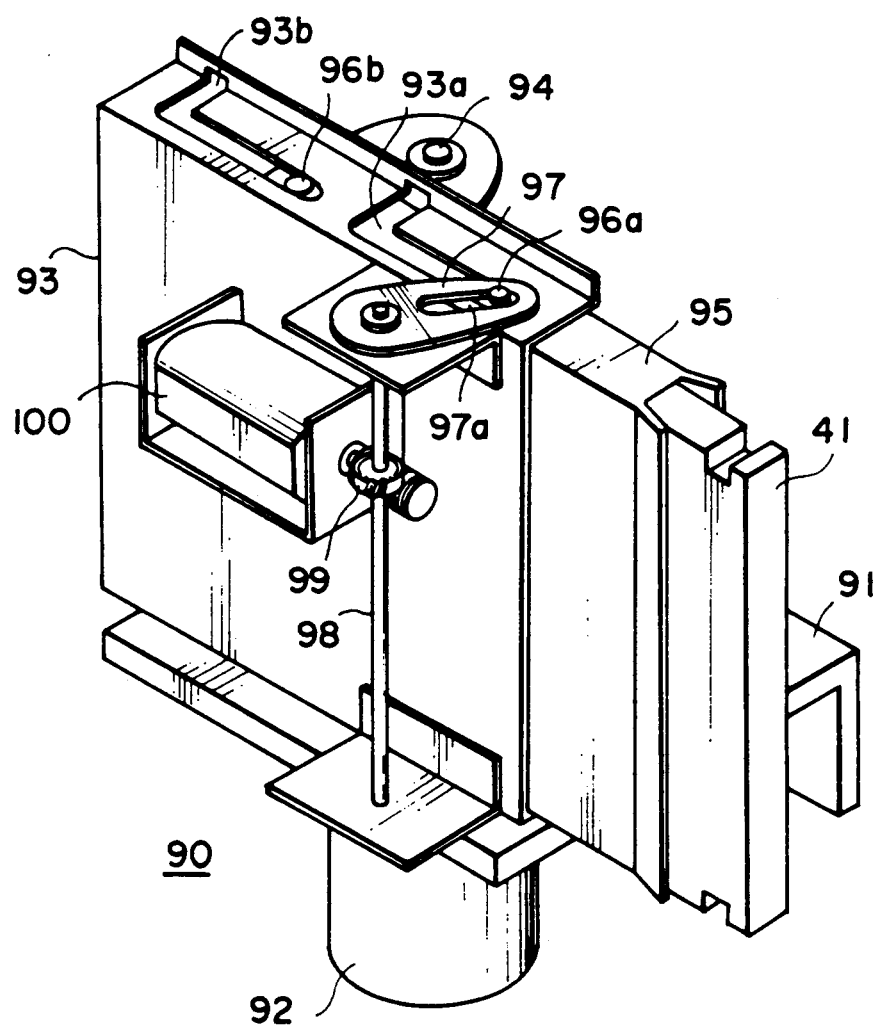

DISK-STORAGE DEVICE

BACKGROUND OF THE INVENTION

1. Field of the Invention

This invention relates to a disk-storage device of the type in which disks serving as a recording medium, such as optical disks, that are lodged on housing shelves, are selectively extracted so as to record and reproduce information.

2. Description of the Related Art

FIG. 1 is a side sectional view showing a conventional disk-storage device, which is disclosed in, for example, Japanese Patent Laid-Open No. 63-187466. FIG. 2 is a front sectional view of the same. As shown in the drawings, a multitude of cartridges 1 which contain disks serving as a recording medium are lodged in a stacker 2 consisting of a number of shelves 3. Two recording/reproducing units 4 are provided below the stacker 2. When cartridges 1 are inserted into these recording/reproducing units 4, the recording and reproduction of information are effected on and from the disk contained in these cartridges. A carrier 5 is provided which constitutes a conveying mechanism adapted to grip cartridges 1 and to move them in the vertical direction. This carrier 5 comprises a first and a second carrying member 5a, 5b and is fixed, through a rotating shaft 6, to a sliding carriage 8 adapted to move along a vertical guide rail 7. The first and second carrying members 5a and 5b are respectively equipped with fingers 9a and 9b which serve as clutching means. FIG. 3 shows one of these fingers in detail. As shown in FIG. 3, a pair of hooks 10 are rotatably supported by axles of rotation 11 which are fixed to a base (not shown) slidably arranged in the carrier 5. A pair of links 13 connect the base ends of the hooks 10 to the operating member of a solenoid 12. That is, the hooks 10 are caused to make opening and closing movements by the solenoid 12. The operating member of the solenoid 12 is restored to its original position by means of a spring 14.

Referring again to FIGS. 1 and 2, the carrying members 5a and 5b are respectively equipped with finger motors 15a and 15b adapted to move the fingers 9a and 9b in the direction in which cartridges 1 lie and are put on and taken off the shelves 3. The carrier 5 is equipped with an inversion motor 16 adapted to turn upside down the carrying members 5a and 5b. A vertical-drive motor 17 transfers the carrier 5 in the vertical direction through a belt 18. The position of the carrier 5 in the vertical direction can be determined from a scale 19 provided along the guide rail 7. This scale 19 is read by a scale sensor 20 shown in FIG. 4. This scale sensor 19 makes use of holes 19a provided at certain intervals on the scale 19, detecting the position of the carrier 5 by means of a combination of a light-emitting section (not shown) and a photo sensor (not shown).

The entire disk-storage device is enclosed in a cover 21. Provided in the upper section of the front panel 22 of the cover 21 is a cartridge-supply/discharge opening 23 through which cartridges 1 are inserted into and extracted from the device. A slide table 24, which has a built-in cartridge-supply/discharge mechanism 25 serves to put out and take in cartridges 1 through the cartridge-supply/discharge opening 23 and to transfer them inside the device. A sliding carriage 27 causes the slide table 24 to slide along a horizontal guide rail 26. The slide table 24 is supported by a support arm 28. The sliding carriage 29 is moved along the horizontal guide rail 26 by means of a horizontal-drive motor 29. The slide table 24 is equipped with a cartridge-supply/discharge motor 30 adapted to move cartridges 1 taken in by the cartridge-supply/discharge mechanism 25.

The operation of this conventional disk-storage device will now be described. When lodging a cartridge 1 in the disk-storage device, the horizontal drive motor 29 is first driven so as to bring the slide table 24 to a position before the cartridge-supply/discharge opening 23. In this state, the cartridge-supply/discharge motor 30 is driven to operate the cartridge-supply/discharge mechanism 25, transferring the cartridge 1 through the cartridge-supply/discharge opening 23 into the slide table 24. The horizontal-drive motor 29 is then driven again so as to bring the slide table 24 back to the position shown in FIG. 1.

Next, the operation of lodging this cartridge 1 on a predetermined shelf 3 will be described. First, the vertical-drive motor 17 is driven to move the carrier 5 upwards, stopping it at the position where the first carrying member 5a is on the same level as the slide table 24, this position being detected by means of the scale 19 and the scale sensor 20. Then, the finger motor 15a is driven to cause the finger 9a to be extracted from the first carrying member 5a. When the front ends of the hooks 10 have reached the grip section of the cartridge 1, the solenoid 12 is operated to open the hooks 10. The cartridge 1 is then clutched, and, in this state, the finger motor 15a is driven again to cause the finger 9a to be drawn in the carrying member 5a. Next, the vertical-drive motor 17 is driven to lower the carrier 5, stopping it at the position where the first carrying member 5a is on the same level as the target shelf 3. As in the above operation, the position concerned is detected by means of the scale sensor 20. Here, the finger motor 15a is driven again to cause the finger 9a to be extracted again. When the cartridge 1, held by the finger 9a, has reached a predetermined position in the shelf 3, the solenoid 12 is driven to open the hooks 10, and the finger 9a is retracted, leaving the cartridge 1 on the shelf 3. In this way, cartridges 1 can be lodged on predetermined shelves 3. A similar operation is performed when inserting cartridges 1 into the recording/reproducing units 4. Cartridges 1 lodged on shelves 3 or in the recording/reproducing units 4 can be transferred by way of the cartridge-supply/discharge opening 23 to the exterior of the device by performing the above-described operation in the reverse order.

Next, the operation of changing positions between a cartridge 1X which has already been lodged in one of the recording/reproducing units 4 and a cartridge 1Y which is lodged on a shelf 3, will be described, focusing, in particular, on the movement of the carrier 5. First, either one of the carrying members, for example, the carrying member 5a, is brought to the predetermined position in the stacker 2, where the cartridge 1Y is transferred into this carrying member. Then, the carrier 5 is lowered, stopping it at a position where the other carrying member, i.e., the carrying member 5b, is on the same level as the cartridge 1X, which is lodged in one of the recording/reproducing units 4. There, the cartridge 1X is transferred into the second carrying member 5b by means of the finger 9b. The carrier 5 is then further lowered, transferring the cartridge 1Y in the first carrying member 5a into the recording/reproducing unit 4 concerned. Thus, the conveying mechanism of this device is equipped with two carrying members 5a and 5b, so that the exchange of positions between the above cartridges 1X and 1Y can be effected solely by once moving the conveying mechanism from the recording-/reproducing unit 4, the time needed for the exchange being shortened accordingly. If the conveying mechanism were equipped with only one carrying member, the cartridge 1X in the recording/reproducing unit 4 would be first taken out and lodged on a shelf 3; afterwards, the cartridge 1Y, lodged on another shelf 3, would be taken out and inserted into the recording/reproducing unit 4, resulting in an increased distance to be covered by the conveying mechanism, and consequently, an increased exchange time.

Having the above-described construction, this conventional disk-storage device allows the exchange of cartridges 1 between a single recording/reproducing unit 4 and the shelves 3 to be effected in a relatively short time. If, however, the exchange is to be effected between a plurality of recording/reproducing units 4 and the shelves 3, the requisite exchange time will increase accordingly.

Furthermore, when a higher speed and a large capacity are required of the disk-storage device, the following problem is involved: even if the capacity is enlarged by increasing the number of recording/reproducing units 4, their recording/reproducing speed remains rather low when compared to the information-transfer speed between the disk-storage device and the external devices, i.e., the memory and the host computer, so that the demand for a higher recording/reproduction speed cannot be satisfied.

SUMMARY OF THE INVENTION

This invention has been contrived with a view to eliminating the above-mentioned problems experienced with prior art disk-storage devices. It is accordingly an object of this invention to provide a disk-storage device which allows cartridges to be quickly exchanged even if the number of recording/reproducing units is increased, and which can have a higher recording/reproduction speed and a larger capacity, thus operating in harmony with the associated host computer.

In the disk-storage device of this invention, the conveying mechanism has a plurality of clutching sections. At the same time, this disk-storage device is equipped with a plurality of recording/reproducing units and lodging shelves, the number of the recording/reproducing units and of the lodging shelves being the same as the number of clutching sections. These three categories of the components are arranged in the same positional relationship.

In another embodiment of this invention, the disk-storage device is equipped with loading mechanisms which allow a plurality of cartridges taken in through the cartridge-supply/discharge openings to be simultaneously clutched by a plurality of clutching sections of the conveying mechanism.

In still another embodiment of this invention, the disk-storage device of this invention comprises a divisional-recording means adapted to time-divide information from outside and to distribute the information thus divided to the recording/reproducing units so as to perform the recording process for each disk, and a synthetic-reproduction means adapted to individually reproduce information contained in the disks and to transmit the information thus individually reproduced to the exterior.

Suppose cartridges have already been lodged to recording/reproducing units and these cartridges are to be moved to predetermined lodging shelves. First, the conveying mechanism is moved to a predetermined position where each of the clutching sections thereof faces the corresponding recording/reproducing unit. Since the clutching sections are arranged in the same positional relationship as the recording/reproducing units, all the cartridges lodged in the recording/reproducing units can be simultaneously clutched and extracted by operating the clutching sections. The conveying mechanism is moved in this state, and is stopped at a predetermined position with respect to the lodging shelves. Since the lodging shelves are also arranged in the same positional relationship as the clutching sections, all these cartridges can be simultaneously lodged on lodging shelves by operating the clutching sections. The movement of the cartridges from the lodging shelves to the recording/reproducing units as well as their movement between lodging shelves are effected in the same manner as above.

The operation of bringing cartridges into the device is performed as follows: first, the loading mechanisms temporarily hold a plurality of cartridges taken in through the cartridge-supply/discharge openings. Then, the position in which these cartridges are held is adjusted by operating the loading mechanisms, and the cartridges are simultaneously taken in by the clutching sections of the conveying mechanism which has been moved to the corresponding position.

When recording information from the exterior on the disks, the divisional recording means time-divides the information into predetermined periods of equal length the number of which corresponds to the number of disks, i.e., the number or recording/reproducing units. The information thus divided is distributed to the recording/reproducing units, effecting recording individually for each of the disks lodged in them. When reproducing information, the recording/reproducing units read out the information recorded on the disks, and the synthetic reproduction means demodulation-synthesizes the information thus reproduced and transmits it to the exterior.

BRIEF DESCRIPTION OF THE DRAWINGS

FIGS. 13A to 13C are perspective views showing in detail one of the loading mechanisms of FIG. 12.

DETAILED DESCRIPTION OF THE PREFERRED EMBODIMENTS

Figure 1:
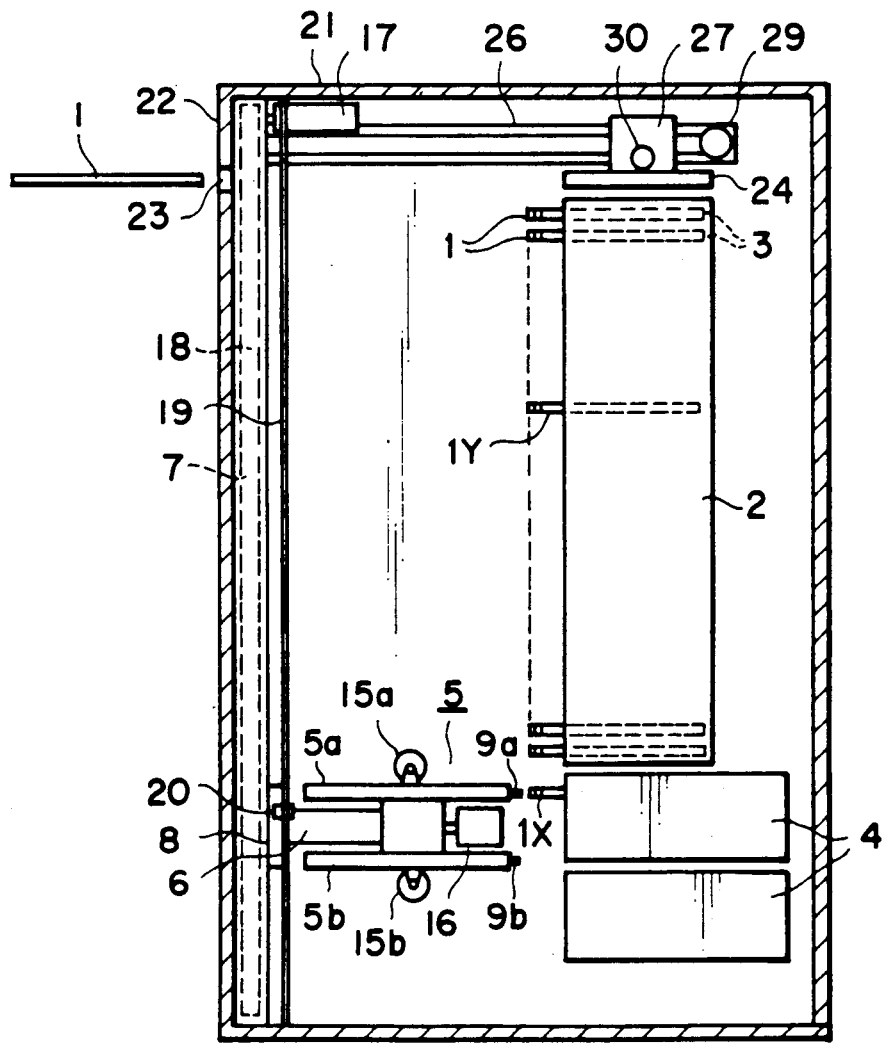
FIG. 1 is a side sectional view of a convention disk-storage device.
Figure 2:
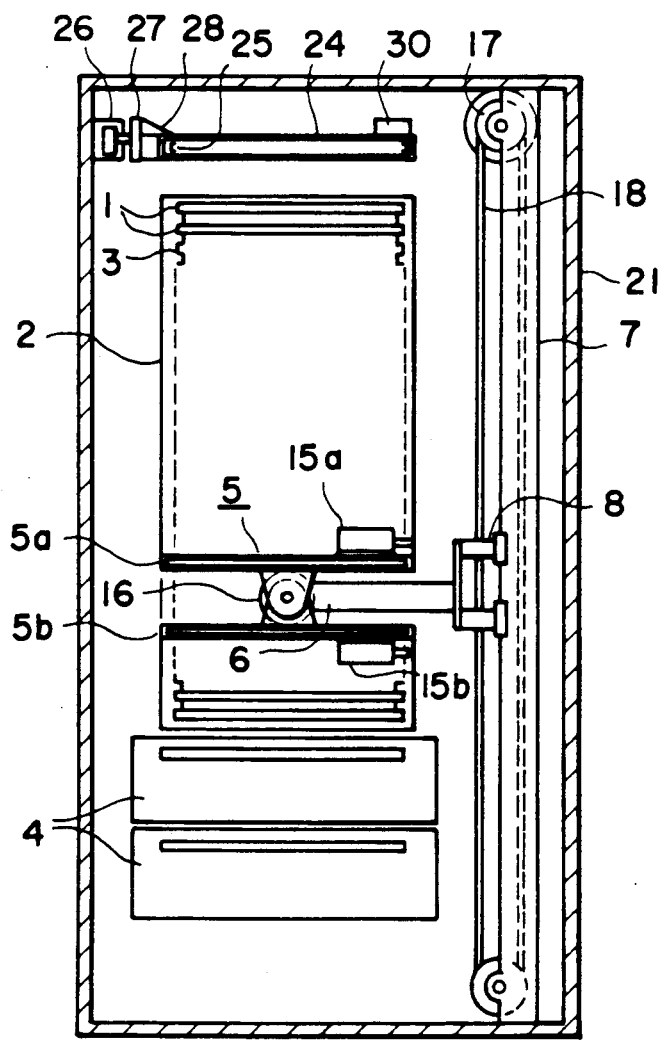
FIG. 2 is a front sectional view of the this conventional disk-storage device.
Figure 3:
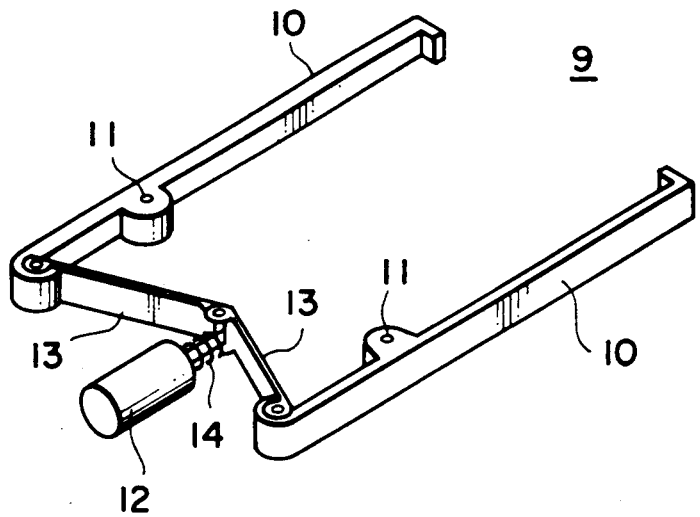
FIG. 3 is a perspective view of the finger section of the device shown in FIGS. 1 and 2.
Figure 4:
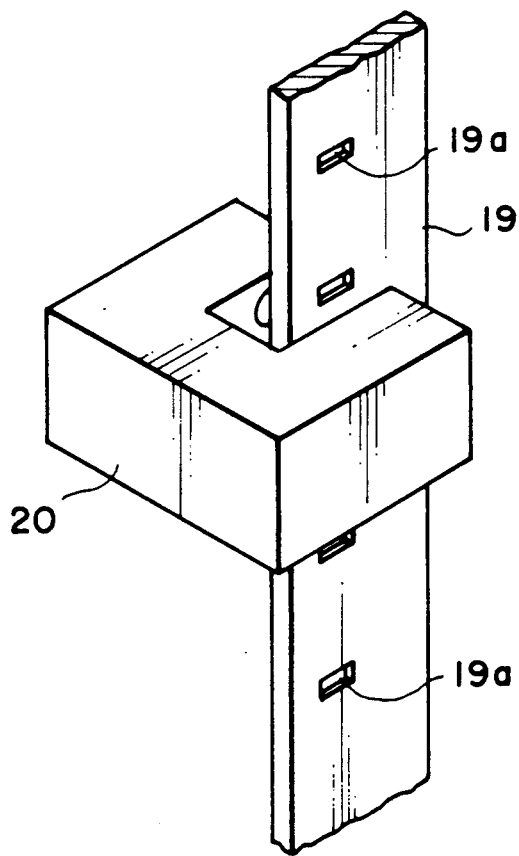
FIG. 4 is a perspective view of the scale section of the device shown in FIGS. 1 and 2.
Figure 5:
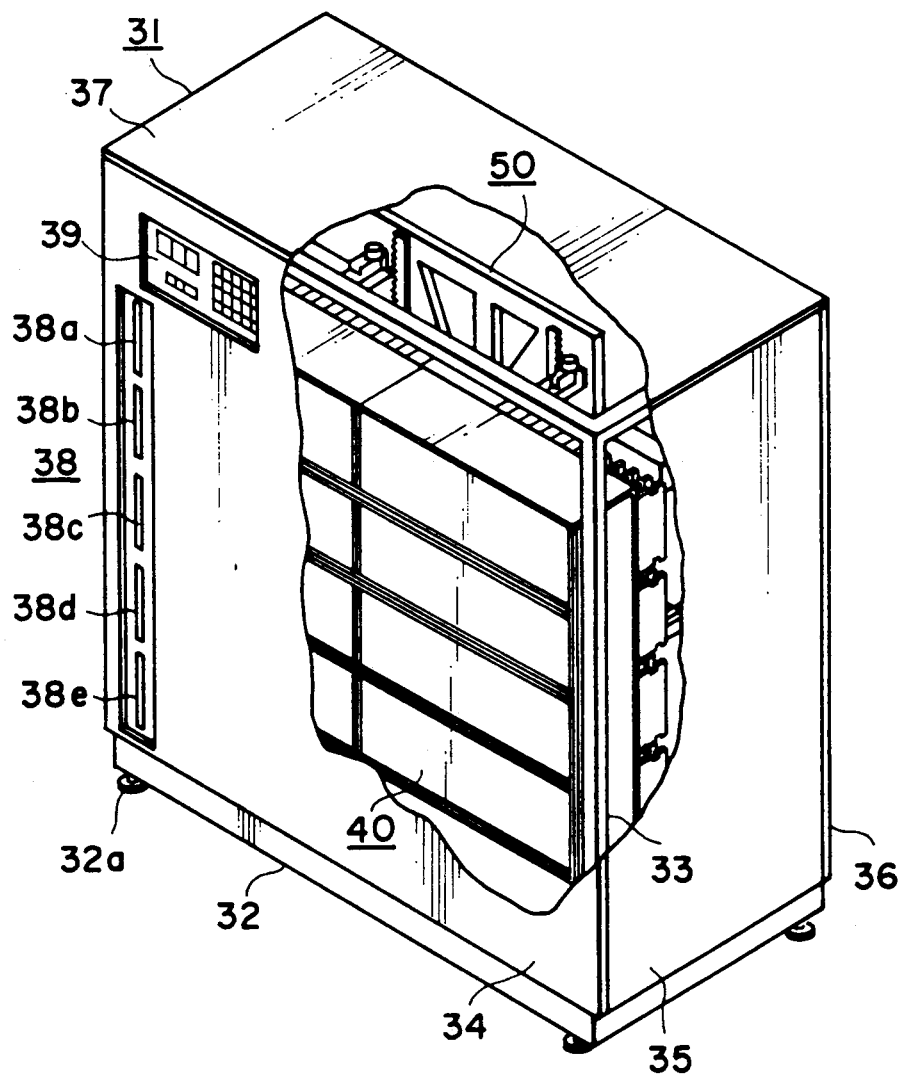
FIG. 5 is an overall perspective view, as seen obliquely on the front side, of a disk-storage device in accordance with an embodiment of this invention.

An embodiment of this invention will now be described with reference to the accompanying drawings. FIG. 5 is an overall perspective view, as seen obliquely on the front side, of a disk-storage device in accordance with an embodiment of this invention. The device shown in enclosed in a cover 31 serving as a case. This cover 31 is composed of a base 32 equipped with leveling bolts 32a, a frame 33 assembled on the base 32, a front panel 34, side panels 35, a rear panel 36, and a top panel 37. These panels are attached to the frame 33. Provided in the left-hand end section (as seen in FIG. 5) of the front panel 34 are five cartridge-supply/discharge openings 38a to 38e, arranged in the vertical direction. An operating panel section 39 is provided in the upper left-hand corner (as seen in FIG. 5) of the front panel 34. Provided in the cover 31 is a loading frame 40 collectively lodging a plurality of sets of recording/reproducing units and cartridge-lodging shelves, which will be described below. The cover 31 also encloses a conveying mechanism 50 which is equipped with a plurality of clutching sections, which will be likewise described below. Provided behind (i.e., on the inner side of) the supply/discharge openings 38a to 38e constituting a set of cartridge-supply/discharge openings 38 are a corresponding set of loading mechanisms 90 (not shown in FIG. 5) for taking in cartridges through these openings.

Figure 6:
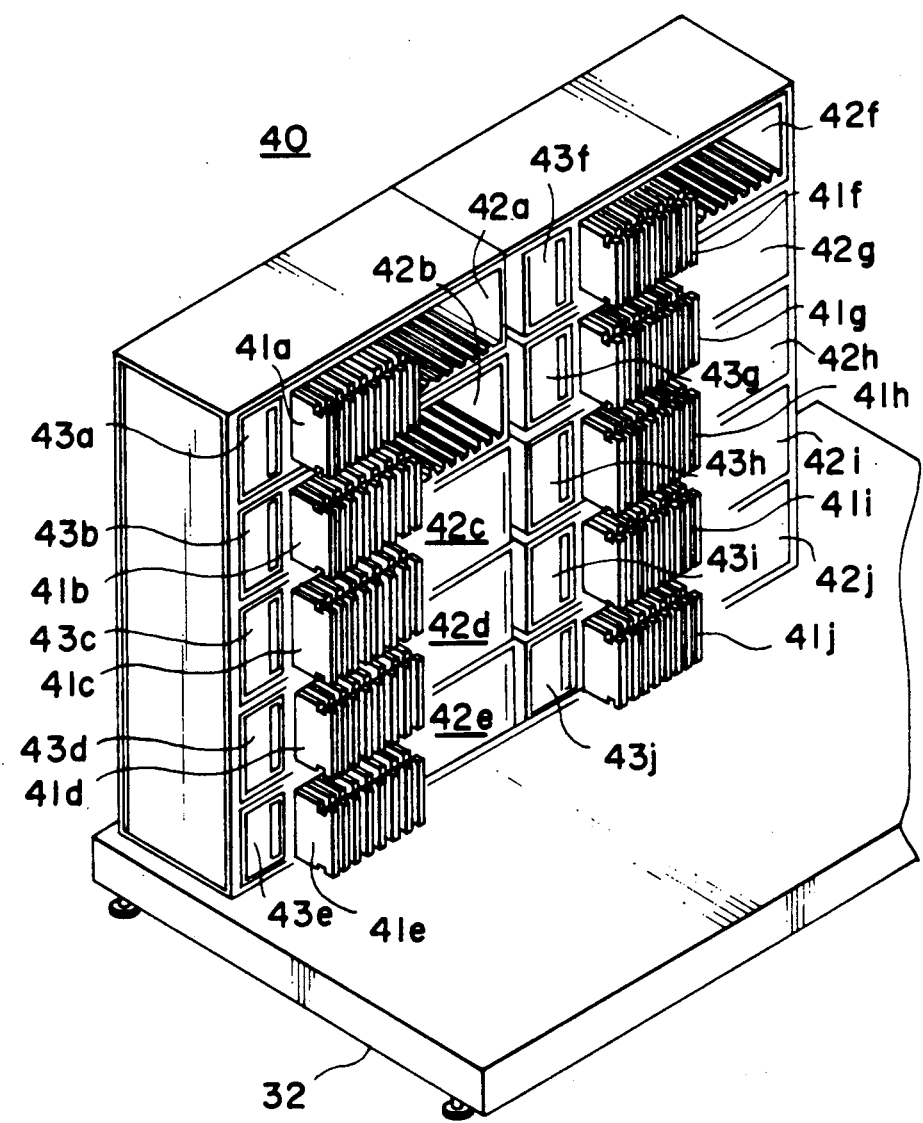
FIG. 6 is a perspective view of the lodging shelves, as seen on the rear-panel side, of the device shown in FIG. 5.

The structure and operation of the different sections of this device will now be described one by one. FIG. 6 is a perspective view of the lodging frame 40 as seen in the direction in which the cartridges are lodged and extracted, i.e., as seen on the side of the rear panel 36. The reference numerals 41a to 41j indicate cartridges, which are lodged on lodging shelves 42a to 42j, respectively, and which, as in the conventional device described above, contain disks. In the device shown, there are provided 10 sets in total of lodging shelves 42 and recording/reproducing units 43, which are arranged in two rows in the horizontal direction and in five stages in the vertical direction. The vertical space between adjacent sets is the same as that between adjacent ones of the cartridge-supply/discharge openings 38a to 38e. The horizontal space between adjacent sets is the same as the horizontal distance between the clutching sections of a conveying mechanism 50 which is to be described below.

Figure 7:
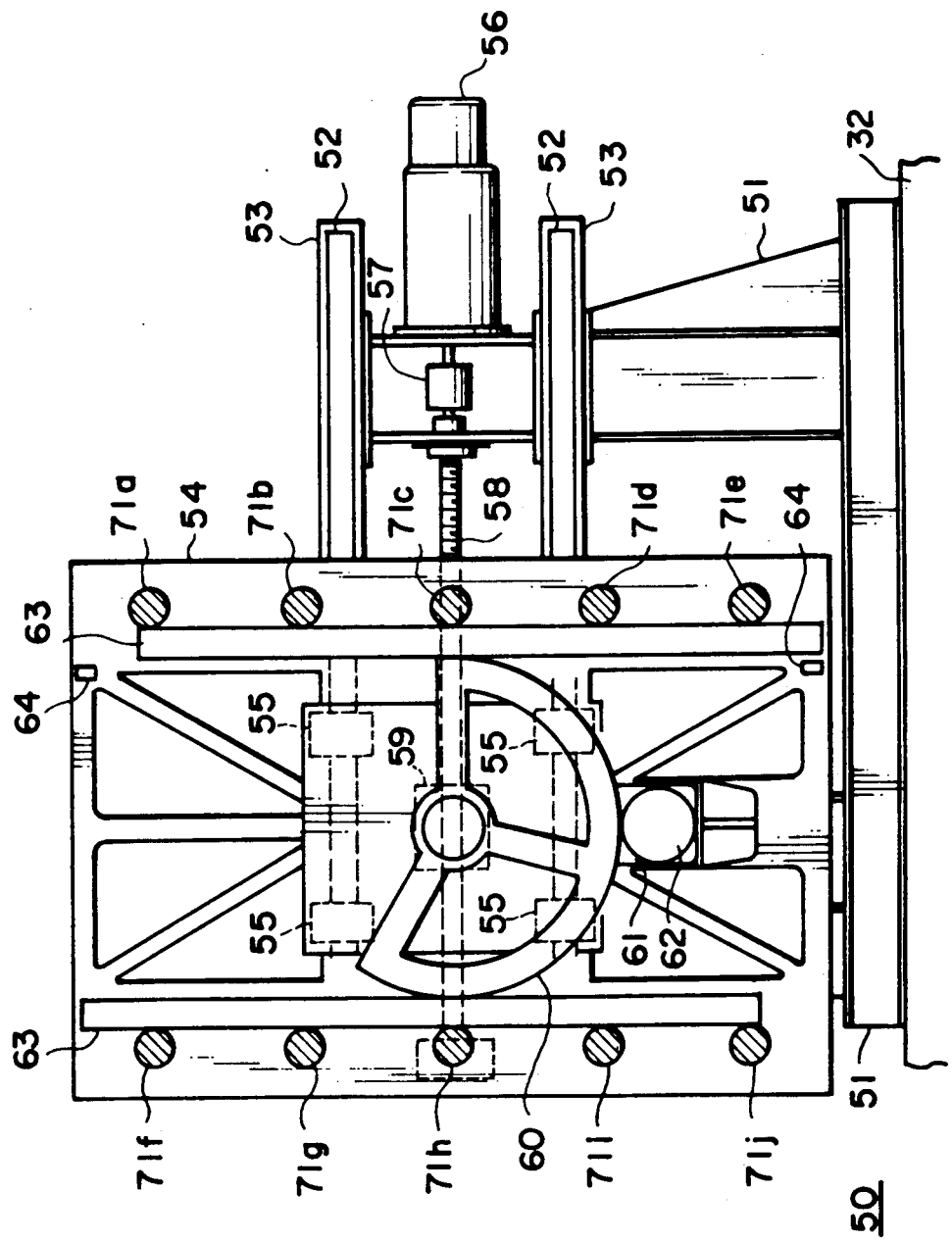
FIGS. 7 to 9 are a front view, a perspective view as seen obliquely on the rear side, and a side view, respectively, of the conveying mechanism of this device.
Figure 8:
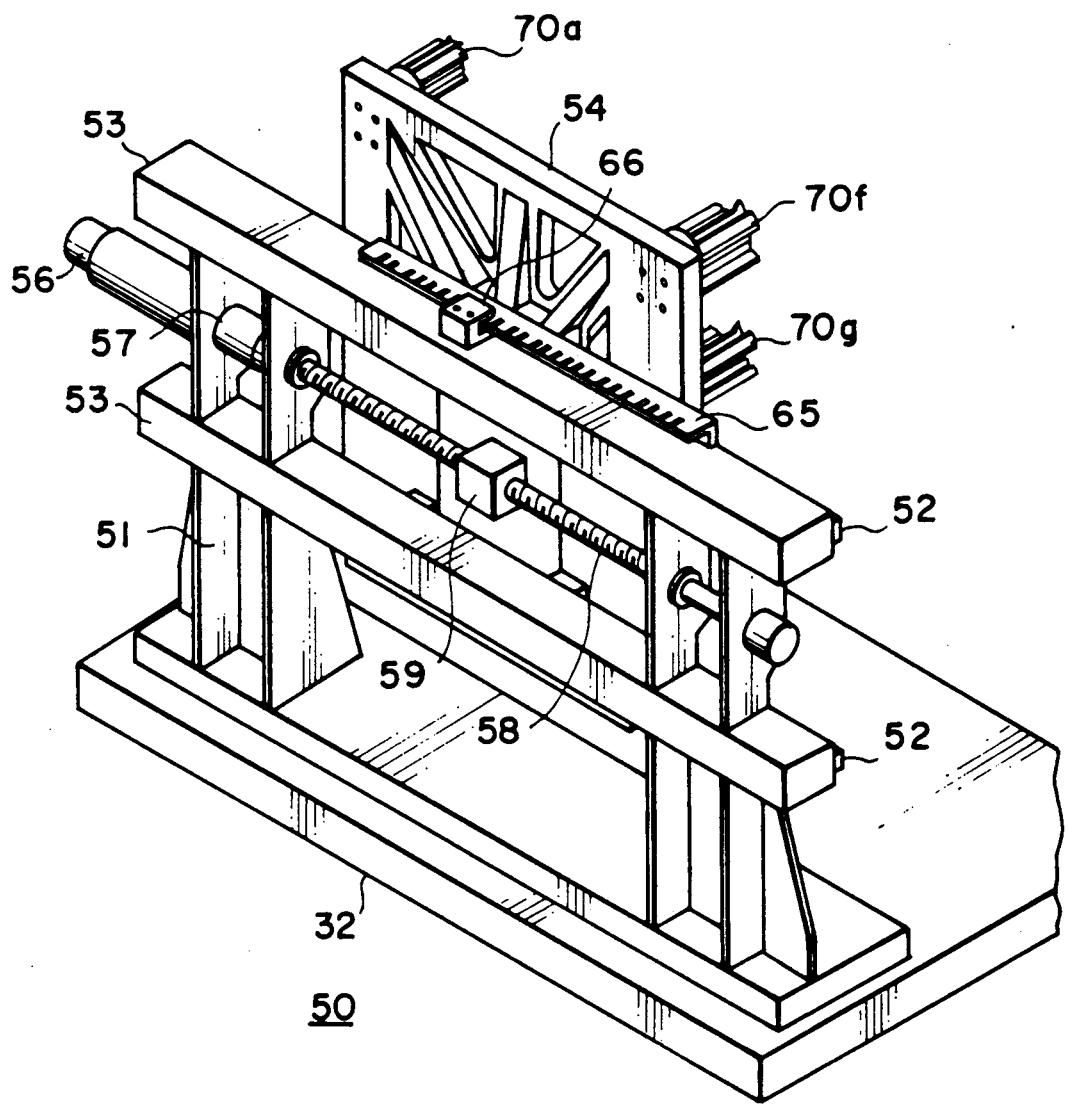
Figure 9:
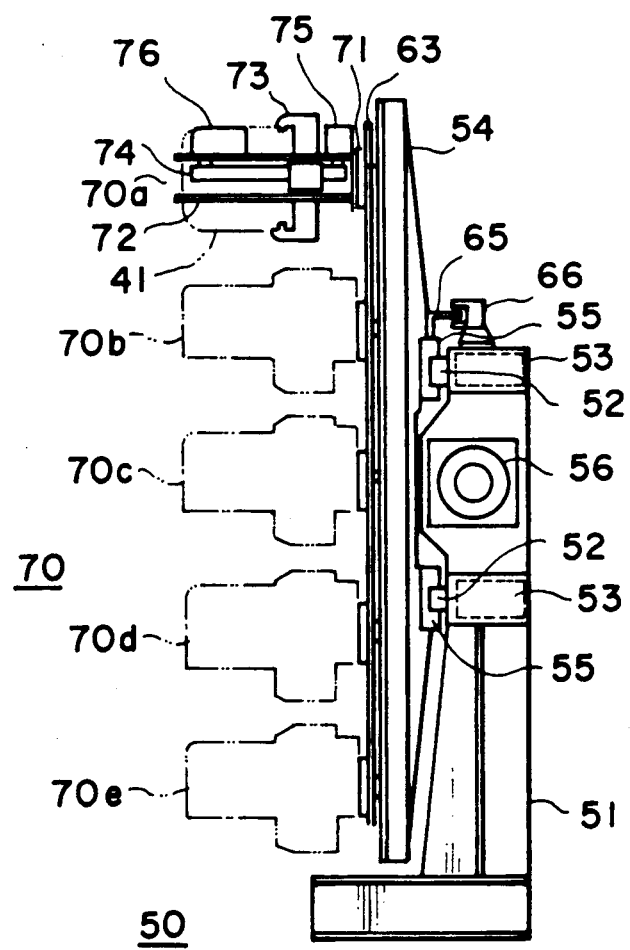

FIGS. 7 to 9 show in detail the conveying mechanism 50 mentioned above; FIG. 7 is a front view, FIG. 8 is a perspective view as seen obliquely from behind, and FIG. 9 is a side view, of this mechanism. Referring now to these drawings, the reference numeral 51 denotes a frame base fixed to the base 32. Two horizontal rails 52 are arranged, one above the other, on this base frame 51 through the intermediary of columns 53. A base plate 54 is a plate to which clutching sections 70 (to be described below) are attached. Fixed to this base plate 54 are sliders 55, which are adapted to engage with the rails 52, thereby establishing the base plate 54 to slide along the rails 52. The base plate 54 is driven by a motor 56, to the rotating shaft of which a threaded bar 58 is connected through a coupling 57. This threaded bar 58 is engaged with a ball screw 59 which is fixed to the base plate 54. Rotatably mounted on the base plate 54 is a large gear 60 which is engaged with a motor gear 62 connected to the rotating shaft of a motor 61 that is provided below this large gear 60. Racks 63 are attached to the base plate 54 in such a manner as to be slidable in the vertical direction. One side of each rack 63 is engaged with the large gear 60, and the other side thereof is engaged with small gears 71a to 71j belonging to the clutching sections 70. In FIG. 7, the clutching sections 70 are indicated by the sections of the small gears 71a to 71. Limit switches 64 serve to detect the upper and lower ends of the racks 63. The base plate 54 is further equipped with a slitted scale 65. A scale sensor 66 is attached to one of the columns 53. This scale sensor 66, equipped with optical elements, engages with the slitted scale 65, thereby allowing the horizontal position of the base plate 54 to be detected.

Next, the clutching section 70 will be described in detail focusing on the clutching section 70a shown in FIG. 9. The clutching section 70a shown includes a frame 72 which is integral with the small gear 71 and which is rotatably mounted on the base plate 54. The distance between adjacent ones of the clutching sections 70a to 70e is adapted to that between adjacent ones of the cartridge-supply/discharge openings 38a to 38e. A hand part 73, which is to be described below, is mounted on the frame 72 in such a manner as to be slidable in the direction in which cartridges lie and are put on and taken off the shelves. This hand section 73 is separately fixed to a belt 74 which is driven by a belt motor 75. A guide 76 controls the position in the thickness direction of a cartridge 41 indicated by the two-dot chain line of FIG. 9.

Figure 10:
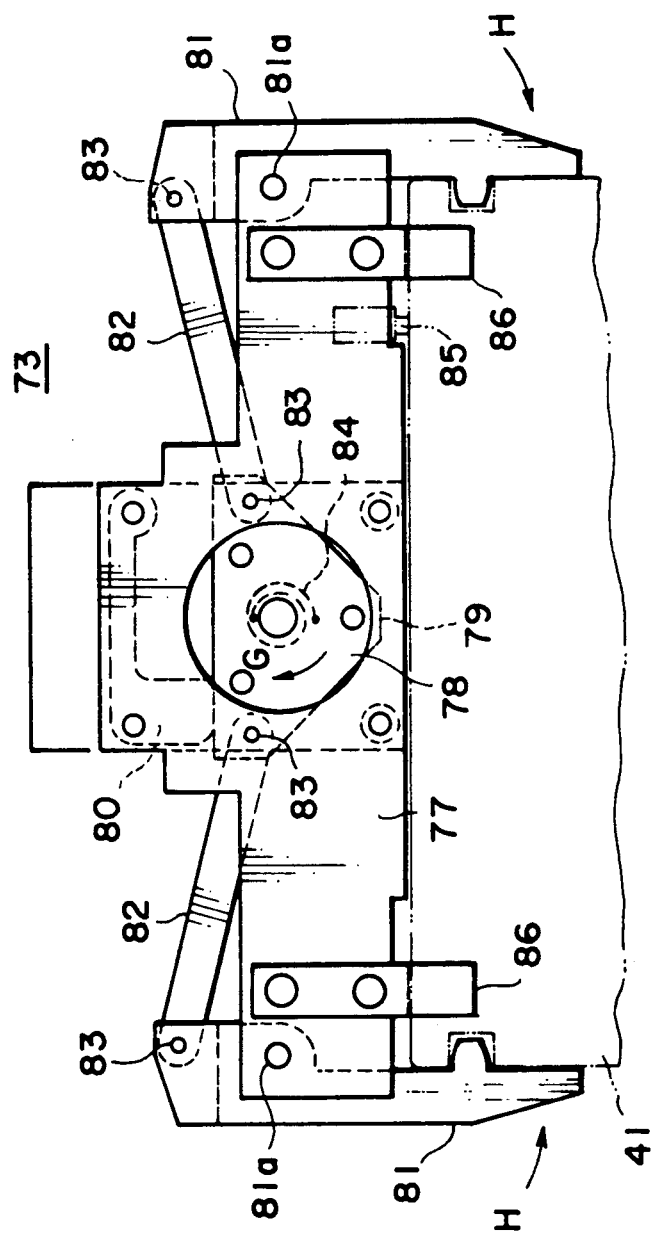
FIGS. 10 and 11 are plan views showing the hand part of a clutching section of this device in the state where its hooks are open and in the state where they are closed, respectively.
Figure 11:
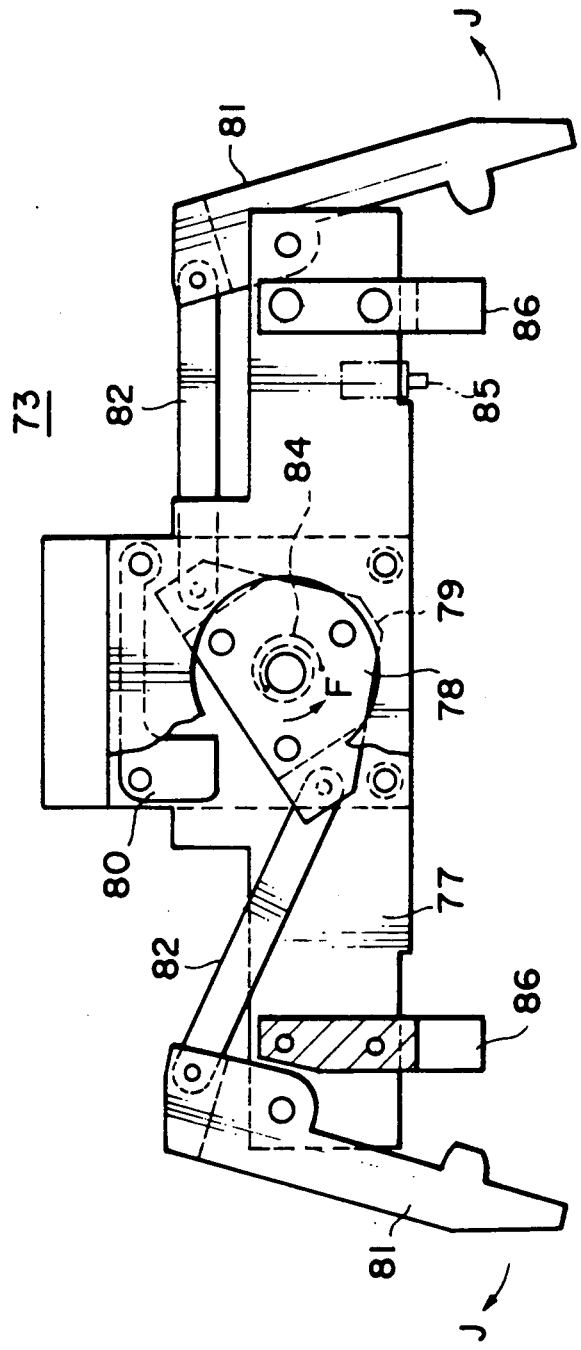

FIGS. 10 and 11 are plan views showing in detail the construction of the hand part 73 of the clutching section 70; FIG. 10 shows the state in which its hooks 81 are closed, and FIG. 11 shows the state in which they are open. The hand part shown includes a body plate 77 on which a rotary solenoid 78 is mounted. A first link 79 is attached to the axle of rotation of this rotary solenoid 78. A stopper 80 serves as the stopper for this first link 79. Each of the pair of hooks 81 is rotatably mounted on the body plate 77 through an axle 81a. Second links 82 connect the first link 79 to the hooks 81 through pins 83. One end of a spring 84 is fixed to the body plate 77 and the other end thereof is fixed to the axle of rotation of the rotary solenoid 78. The hand part shown further includes a limit switch 85 for checking whether the clutching of the cartridge 41 is being effected, and expelling sections 86 for expelling the cartridge 41.

Figure 12:
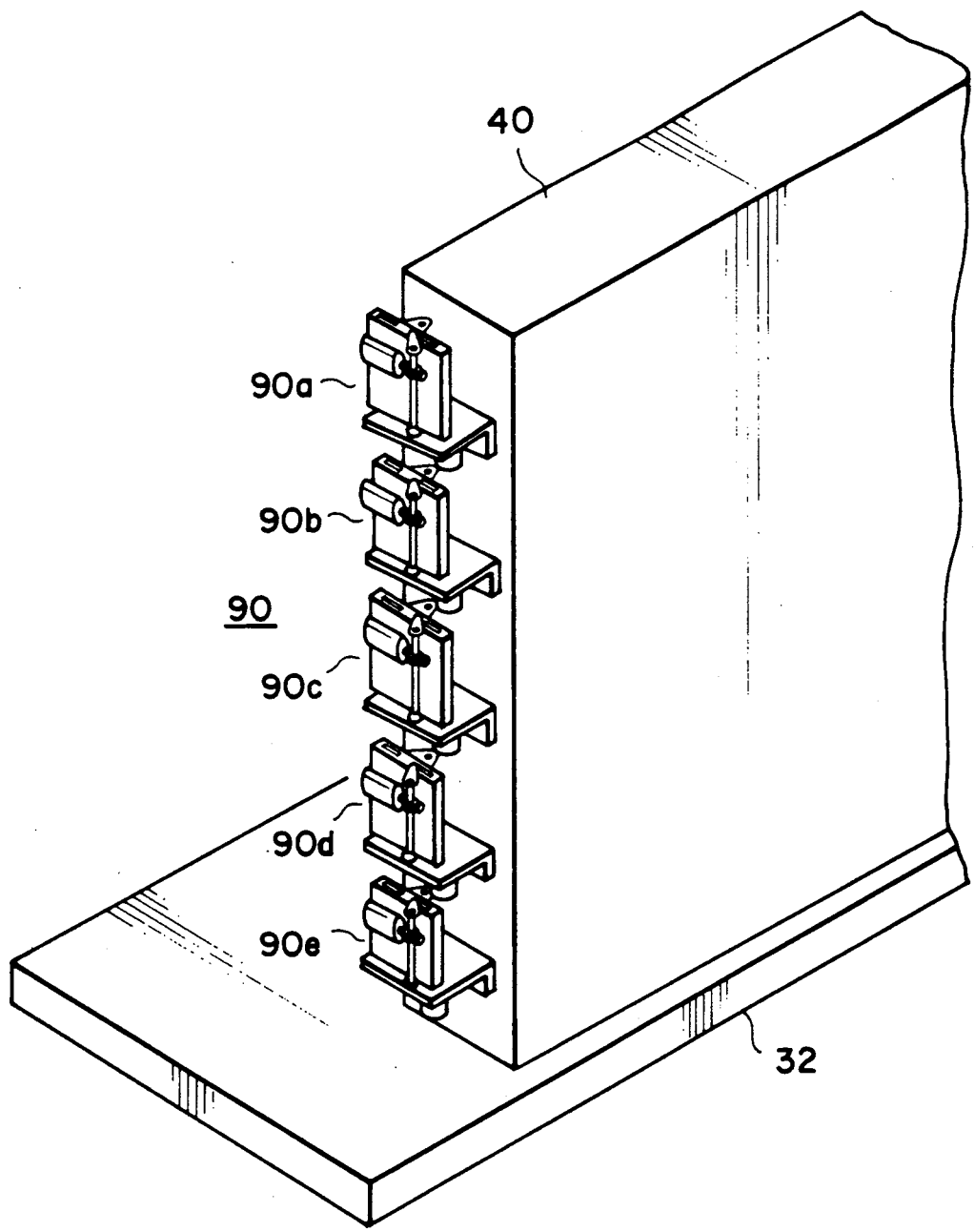
FIG. 12 is an overall perspective view showing the loading mechanisms of this device in the state where they are mounted on the lodging frame.
Figure 13B:
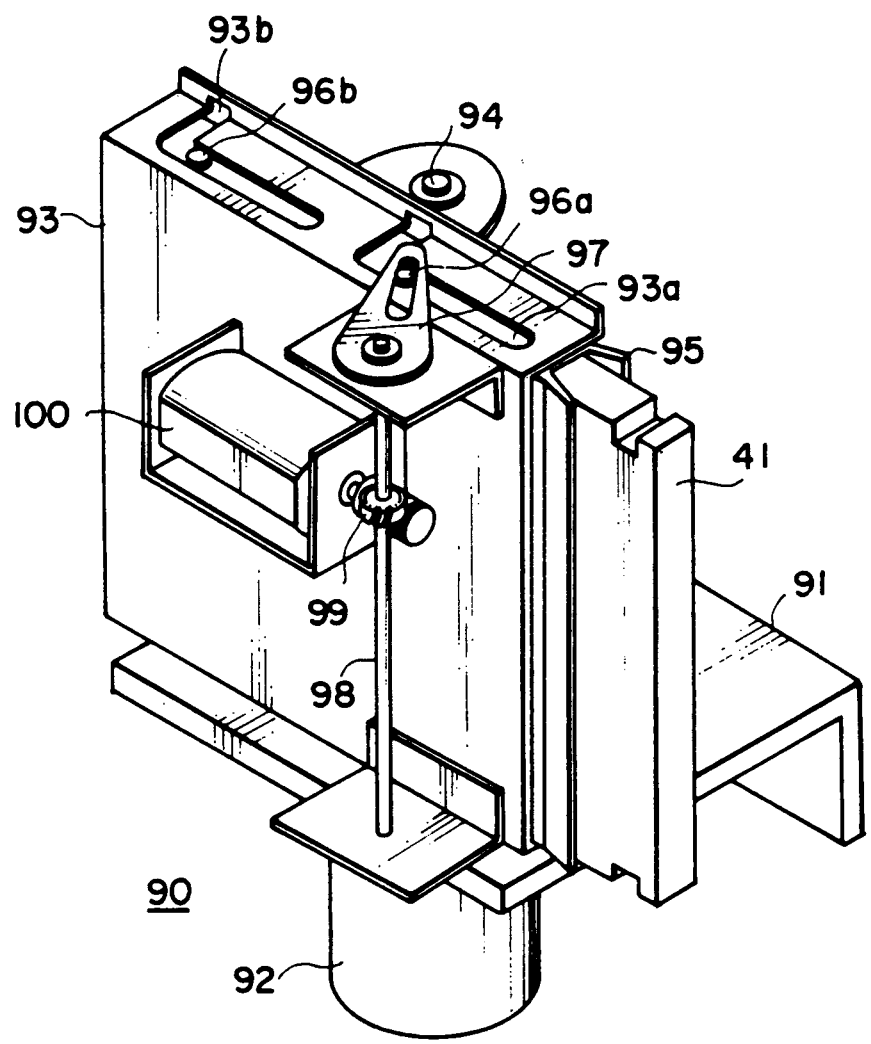
Figure 13C:
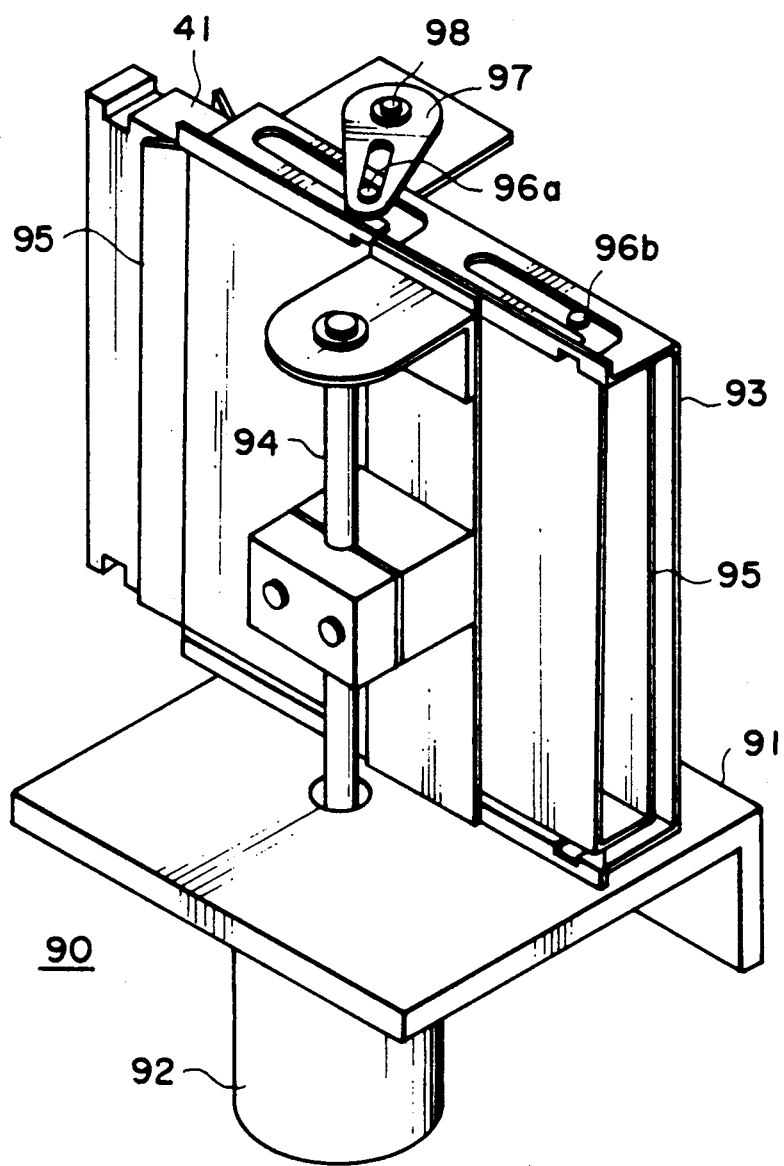

The structure of the loading mechanisms 90 will now be described in detail. FIG. 12 is an overall perspective view showing the loading mechanisms 90 in the state in which they have been mounted. These loading mechanisms 90 are arranged in the vertical direction on the side surface of the lodging frame 40 in such a manner as to be situated behind the cartridge-supply/discharge openings 38a to 38e shown in FIG. 5. Of course, the mounting dimensions for the loading mechanisms 90a to 90e are adapted to the positions of the cartridge-supply/discharge openings 38a to 38e. FIGS. 13A to 13C show in detail the structure of an individual loading mechanism 90. The loading mechanism shown includes a mounting plate 91 the vertical section of which is fixed to the side surface of the lodging frame 40. A Motor 92 serves to turn the entire mechanism by 180°, and a body case 93 is fixed to the shaft 94 of this motor 92. A holder 95 is slidably arranged in the recess of the body case 93, and contains a cartridge 41. Rollers 96a and 96b are fixed to the side surface of the holder 95 and slide respectively along L-shaped grooves 93a and 93b formed on the side surface of the body case 93. An arm lever 97 is rotatably mounted on the body case 93, and the roller 96a is engaged with an elongated hole 97a provided in this arm lever 97. An axle of rotation 98 vertically extending and fixed to the arm lever 97 is rotated by a motor 100 through a worm gear 99.

The operation of each mechanism will now be described. First, suppose, as shown in FIG. 6, cartridges 41a to 41j are lodged on the shelves 42a to 42j. Here described will be the operation of selecting the required cartridge 41 from among these cartridges and inserting it into the associated recording/reproducing unit 43. When an external host computer issues a command for this operation, the control section (not shown) of the disk-storage device decodes this command, and, first operates the motor 56 of the conveying mechanism 50 in a predetermined direction of rotation. In the following, FIGS. 7 and 8 will be referred to. The rotation of the motor 56 is transmitted through the coupling 57 to the threaded bar 58, and the ball screw 59 transforms the rotation of this threaded bar 58 into a horizontal movement of the base plate 54. Thus, the base plate 54 is caused to slide along the rails 52 by the rotation of the motor 56. The position of the base plate 54 is detected by counting the number of light pulses entering the scale sensor 66 through the slits of the slitted scale 65. When the positions of the clutching sections 70a to 70j provided on the base plate 54 have become matched with the lodging positions of the designated cartridges 41a to 41j on the lodging shelves 42a to 42j, the motor 50 is stopped.

Next, the operation of the clutching sections 70 will be described with reference to FIGS. 9 to 11. In all the clutching sections 70, the rotary solenoids 78 of the respective hand parts 73 are energized simultaneously. As shown in FIG. 11, the first link 79 of each clutching section is rotated in the direction indicated by the arrow F against the resilient force of the spring 84. The rotation of the first link 79 is transmitted through the second links 82 to the hooks 81, opening the hooks 81 in the directions indicated by the arrows J. Simultaneously with the above operation, the belt motors 75 of all the clutching sections 70 are operated at the same time, causing the belts 74 to run so as to bring the respective hand parts 73 to the front ends of the respective frames 72. When the respective front-end surfaces of the cartridges 41 have reached the positions where they abut against the expelling sections 86 of the respective hand parts 73, the respective limit switches 86 will operate to release the energization of the rotary solenoids 78. As a result, the first link 79 of each hand part 73 is as shown in FIG. 10, rotated in the direction indicated by the arrow G by the restoring force of the spring 84, and returns to the position of the stopper 80. This causes the hooks 81 to be closed in the directions indicated by the arrows H, and projections provided on their inner sides are engaged with corresponding recesses of the cartridge 41, which is thus clutched by the hand part 73. Each hand part 73, holding a cartridge 41, is retracted to its original position by rotating the belt motor 75 in the direction reverse to the above one. In principle, each of the clutching sections 70a, etc., is to hold one cartridge 41 at one time. However, it can also be so designed as to hold two or more cartridges 41 at one time.

The cartridges 41, held in this way by the hand parts 73, are moved to the positions of the associated recording/reproducing units 43 by operating the motor 56 of the conveying mechanism 50 again. The description of this movement will be omitted here since it is the same as the one above. When the clutching sections 70a, etc. have stopped at their designated positions, the associated belt motors 75 are operated simultaneously, bringing forward the hand parts 73 to predetermined positions, where the cartridges 41 that have been held by them are inserted into the corresponding recording/reproducing units 43a, etc. That is, when the hand parts 73 have reached these predetermined positions, their rotary solenoids 78 are energized again so as to open the hooks 81. The cartridges 41 thus released are drawn in the corresponding recording/reproducing units 43a, etc., by means of operating mechanisms provided in these recording/reproducing units.

When returning the cartridges 41 from the recording/reproducing units 43 to the lodging shelves 42, the above operation is performed in the reverse order.

If it is desired that the cartridges 41 be turned upside down, the motor 61 shown in FIG. 7 is driven to rotate the motor gear 62. This causes the large gear 60 to rotate and the racks 63 on both sides thereof to move in the vertical direction. Since the small gears 71a to 71j of the clutching sections 70a to 70j are all engaged with these racks 63, the vertical movement of these racks 63 causes them to simultaneously rotate. When either limit switch 64 detects one of the limit positions of the racks 63, which are determined in correspondence with a turning angle of 180°, the motor 61 is stopped. The above operation allows all the cartridges 41, held by the clutching sections 70a to 70j, to be turned upside down at the same time.

Next, the operation of transferring cartridges 41 into the disk-storage device by means of the loading mechanisms 90 will be described. First, the loading mechanisms 90a to 90e are set in the stand-by condition shown in FIG. 12. In this condition, the respective openings of the holders 95 are matched with the positions of the cartridge-supply/discharge openings 38a to 38e provided in the front panel 34.

Here, the operator inserts five cartridges 41 into the device through the cartridge-supply/discharge openings 38a to 38e. The cartridges 41 are lodged in the holders 95, as shown in FIG. 13A. Subsequently, the motor 100 of each loading mechanism is driven to rotate the arm lever 97 counterclockwise through the worm gear 99. The rollers 96a and 96b are then moved through the grooves 93a and 93b, respectively, and the holder 95 is drawn in the body case 93, as shown in FIG. 13A. Here, the motor 92 is driven to rotate the shaft 94, thereby turning the body case 93 by 180° in a horizontal plane, as shown in FIG. 13C. Subsequently, the motor 100 is rotated in the direction reverse to the above, thereby causing the holder 95 to protrude from the body case 93. As a result of the above operation, the five cartridges 41 in the respective holder 95 are oriented in the same way as the other cartridges 41 lodged on other shelves 42, so that they can be clutched by the clutching sections 70f to 70j. Then, these five cartridges 41, held by the clutching sections 70f to 70j, are temporarily lodged in the recording/reproducing units 43f to 43j by operating the conveying mechanism 50. Afterwards, the clutching sections 70f to 70j are brought to the positions of the loading mechanism 90a to 90e by operating the conveying mechanism 50 again, an are set in the stand-by condition there. Here, five additional cartridges 41 are inserted into the device through the cartridge-supply/discharge openings 38a to 38e, and the loading mechanism 90a to 90e are operated again to retain the cartridges 41 in predetermined positions and attitudes. It is advantageous to equalize the horizontal distance between the cartridges 41 retained in the loading mechanisms 90 and the cartridges 41 lodged in the recording/reproducing units 43f to 43j with the horizontal distance between the clutching sections 70a, etc., arranged on the right-hand and left-hand ends of the conveying mechanism 50 since this arrangement makes it possible to simultaneously clutch the five cartridges 41 previously lodged in the recording/reproducing units 43f to 43j by means of the clutching sections 70f to 70j and the additional five cartridges 41 which are held in the loading mechanism 90a to 90e. Thus, these ten cartridges 41 are operated simultaneously thereafter by the conveying mechanism 50.

If two rows of cartridge-supply/discharge openings are arranged with a horizontal space corresponding to the horizontal distance between the clutching sections of the conveying mechanism, the operation of taking in cartridges will become simpler although the size of the device will increase accordingly. While in the above-described embodiment the motors 92 are individually provided for the loading mechanisms 90a to 90e, it is possible to drive them with a single motor, making the mechanism for turning the body cases 93 common to these loading mechanisms.

Figure 14A:
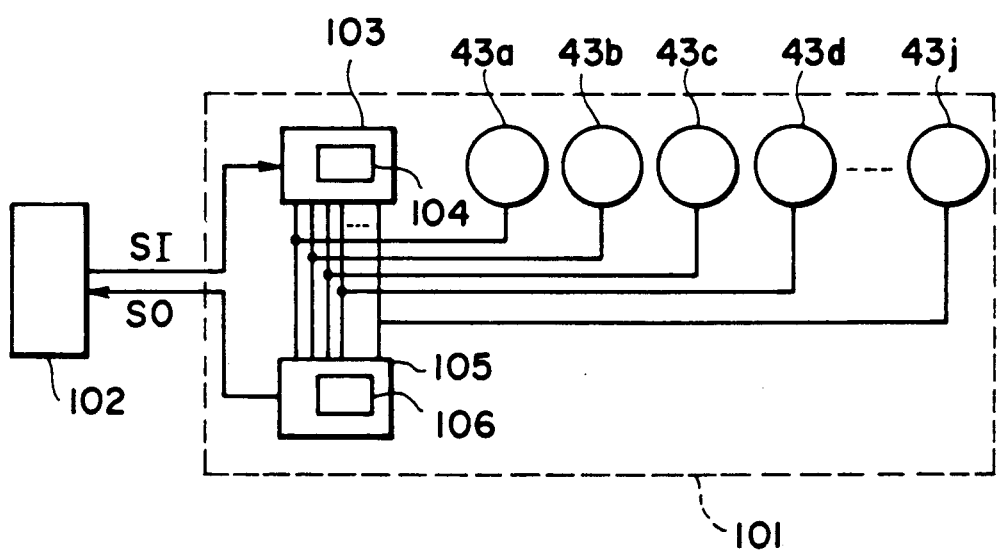
FIGS. 14A to 14C are diagrams illustrating the process of recording and reproducing information which is preferred between the disk-storage device of this invention and the associated host computer.
Figure 14B:
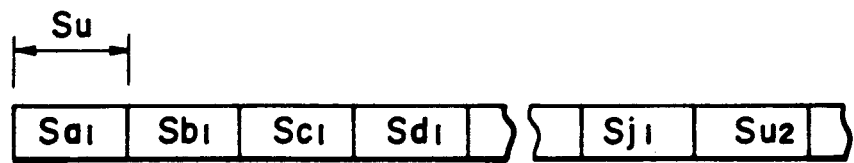
Figure 14C:
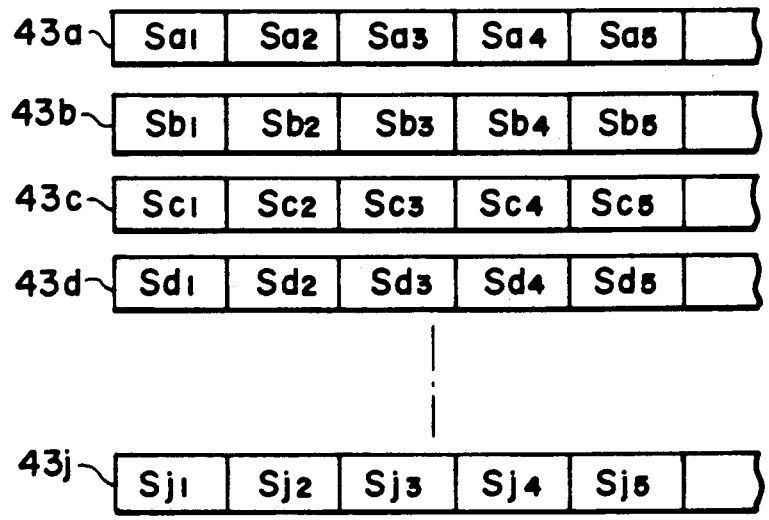

Next, the high-speed recording and reproduction of information by the above-described mechanisms will be described with reference to FIGS. 14A to 14C. Here, the disk-storage device 101 receives information in the form of a signal SI from the external host computer 102 and records it on the disks in it by means of the recording/reproducing units 43a to 43j. It also reproduces information recorded on these disks and outputs it in the form of a signal SO to the host computer 102. Referring to FIG. 14A, the reference signal 103 indicates a recording-process circuit 103 for performing divisional recording. A buffer register 104 is provided in this recording-process circuit 103. The reference numeral 105 indicates a reproduction-process circuit for effecting synthetic reproduction. A buffer register 106 is provided likewise in the reproduction-process circuit 105.

The information-recording/reproduction operation using this disk-storage device will now be described. FIG. 14B shows in time series the input signal SI from the host computer 102. The recording-process circuit 103 time-divides this signal SI into unit signals SU. The unit signals Sa1 to Sj1 thus obtained by time division are temporarily stored in the buffer register 104. The unit signals thus stored are read out in a predetermined sequence and are transmitted to the designated recording-/reproducing units 43a, etc. The recording/reproducing units 43a, etc. record the received unit signals in the designated addresses of the respective disks lodges in them. The above process is performed as many times there are recording/reproducing units, which is ten in this case. FIG. 14C shows how the unit signals thus recorded in the disks which are lodged in the recording-/reproducing units 43a to 43j are arranged.

The reproduction process is performed in an order reverse to the above. That is, the signals recorded on the disks in the order shown in FIG. 14C are individually read out by the recording/reproducing units 43a to 43j, and are temporarily stored in the buffer register 106. By reading out these stored signals sequentially the number of times mentioned above, the signals which have been recorded on the disks in a divided form are demodulation-synthesized and are transformed again into the signals shown in FIG. 14B before being transmitted to the host computer 102.

As a result of this arrangement, the speed of recording and reproduction of the disk-storage device 101 can be substantially increased. Thus, a disk-storage device can be realized which is capable of performing information transfer with the host computer 12 at high speeds and operating in harmony therewith.

As described above, the conveying mechanism of the disk-storage device of this invention has a plurality of clutching sections and these clutching sections are arranged in correspondence with the arrangement of the recording/reproducing mechanism and the lodging shelves, so that a plurality of cartridges can be exchanged at the same time, and the time needed for the exchange is substantially shortened.

In addition, the provision of the above-described loading mechanisms makes it possible to supply or discharge a plurality of cartridges at the same time, which improves the ability of the device to transfer cartridges between the above conveying mechanism and the exterior.

Moreover, the provision of the above divisional recording means and synthetic reproducing means enables the entire disk-storage device to record and reproduce information at a substantially increased speed, thereby making it easier for the disk-storage device to operate in harmony with external apparatuses having high information-transfer speeds.

What is claimed is:

1. A disk-storage device of the type which records and reproduces information using a plurality of disks as the recording medium, the disks being contained in cartridges, the disk-storage device comprising:
   a plurality of recording/reproducing units for recording and reproducing information on and from said disks;
   a plurality of lodging shelves each of which can lodge a plurality of said cartridges;
   a lodging frame adapted to lodge said plurality of recording/reproducing units at predetermined intervals in the vertical and horizontal directions and to likewise lodge said plurality of lodging shelves at predetermined intervals in the vertical and horizontal directions;
   a case which lodges said lodging frame containing said recording/reproducing units and said lodging shelves and in which a plurality of cartridge-supply/discharge openings for taking in said cartridges from the exterior are arranged at said predetermined intervals; and
   a conveying mechanism provided in said case and having a plurality of clutching sections for clutching said cartridges, said clutching sections being arranged at predetermined intervals in the vertical and horizontal directions and adapted to convey said cartridges between said recording/reproducing units, said lodging shelves and said cartridge-supply/discharge openings;

the relative positional relationship between said recording/reproducing units, said lodging shelves and said cartridge-supply/discharge openings being matched with the relative positional relationship between the clutching sections provided in said conveying mechanism, thereby making it possible to clutch and convey a plurality of cartridges at the same time.

2. A disk-storage device as claimed in claim 1, further comprising a divisional recording means adapted to time-divide information from the exterior into predetermined periods of equal length an to distribute the information thus divided to said recording/reproducing units so as to record it on the disks in designated cartridges, and a means for individually reproducing information which is recorded on said disks by said recording/reproducing units in predetermined equal periods any synthesizing and transmitting the information thus individually reproduced.

3. A disk-storage device as claimed in claim 1, further comprising loading mechanism means adapted to temporarily hold a plurality of cartridges taken in the case through said cartridge-supply/discharge openings, and to adjust the position in which said plurality of cartridges are held such a manner that they are simultaneously clutched by the clutching sections of said conveying mechanism.

4. A disk-storage device as claimed in claim 3, further comprising a divisional recording means adapted to time-divide information from the exterior into predetermined periods of equal length and to distribute the information thus divided to said recording/reproducing units so as to record it on the disks in designated cartridges, and a means for individually reproducing information which is recorded on said disks by said recording/reproducing units in predetermined equal periods and synthesizing and transmitting the information thus individually reproduced.

5. A disk-storage device as claimed in claim 4, wherein said recording/reproducing units and said lodging shelves lodged in said lodging frame as well as the clutching sections of said conveying mechanism are respectively arranged in two rows in the horizontal direction and in five stages in the vertical direction, and wherein said cartridge-supply/discharge openings and said loading mechanism means are respectively arranged in one row in the horizontal direction and in five stages in the vertical direction.

* * * * *